(12) United States Patent
Kim et al.

(10) Patent No.: US 9,037,097 B2
(45) Date of Patent: May 19, 2015

(54) CIRCUIT FOR CONTROLLING SWITCHING TIME OF TRANSMITTING AND RECEIVING SIGNAL IN WIRELESS COMMUNICATION SYSTEM

(71) Applicant: Samsung Electro-Mechanics Co., Ltd., Gyeonggi-do (KR)

(72) Inventors: Yu Sin Kim, Gyeonggi-do (KR); Sung Hwan Park, Gyeonggi-do (KR); Sang Hee Kim, Gyeonggi-do (KR)

(73) Assignee: SAMSUNG ELECTRO-MECHANICS CO., LTD., Gyeonggi-Do (KR)

( * ) Notice: Subject to any disclaimer, the term of this patent is extended or adjusted under 35 U.S.C. 154(b) by 120 days.

(21) Appl. No.: 13/801,766

(22) Filed: Mar. 13, 2013

(65) Prior Publication Data

US 2013/0288617 A1    Oct. 31, 2013

(30) Foreign Application Priority Data

Apr. 26, 2012    (KR) .................. 10-2012-0044011

(51) Int. Cl.
    *H04B 1/44*     (2006.01)
    *H04M 1/00*     (2006.01)
(52) U.S. Cl.
    CPC ....................... *H04B 1/44* (2013.01)
(58) Field of Classification Search
    USPC ................. 455/78, 80, 82, 84, 552.1, 553.1
    See application file for complete search history.

(56) References Cited

U.S. PATENT DOCUMENTS

| | | | | |
|---|---|---|---|---|
| 4,756,021 A | * | 7/1988 | Nakayama | 379/388.02 |
| 5,689,818 A | * | 11/1997 | Caglio et al. | 455/83 |
| 7,545,759 B2 | * | 6/2009 | Hayashi | 455/82 |
| 7,787,831 B2 | * | 8/2010 | Uejima et al. | 455/78 |
| 8,170,500 B2 | * | 5/2012 | Seshita et al. | 455/78 |
| 8,391,805 B2 | * | 3/2013 | Ishimori et al. | 455/78 |

FOREIGN PATENT DOCUMENTS

| | | |
|---|---|---|
| JP | 2007-143112 | 6/2007 |
| KR | 1020010017046 | 3/2001 |
| KR | 1020040075969 | 8/2004 |
| KR | 1020080027849 | 3/2008 |
| KR | 1020090103043 | 10/2009 |
| KR | 1020100097342 | 9/2010 |
| KR | 1020110068585 | 6/2011 |

* cited by examiner

*Primary Examiner* — Quochien B Vuong
(74) *Attorney, Agent, or Firm* — Bracewell & Giuliani LLP; Brad Y. Chin

(57) ABSTRACT

Disclosed herein is a circuit for controlling a switching time of a transmitting and receiving signal in a wireless communication system including: a high speed switch circuit unit receiving a signal transceived through an antenna to perform a high speed switching operation; a low speed switch circuit unit the signal transceived through the antenna to perform a low speed switching operation; and a controlling unit applying a control signal for controlling a switching time to the high speed switch circuit unit or the low speed switch circuit unit.

19 Claims, 3 Drawing Sheets

CIRCUIT FOR CONTROLLING SWITCHING TIME OF TRANSMITTING AND RECEIVING SIGNAL IN WIRELESS COMMUNICATION SYSTEM

CROSS REFERENCE(S) TO RELATED APPLICATIONS

This application claims the benefit under 35 U.S.C. Section 119 of Korean Patent Application Serial No. 10-2012-0044011, entitled "Circuit for Controlling Switching Time of Transmitting and Receiving Signal in Wireless Communication System" filed on Apr. 26, 2012, which is hereby incorporated by reference in its entirety into this application.

BACKGROUND OF THE INVENTION

1. Technical Field

The present invention relates to a circuit for controlling a switching time of a transmitting and receiving signal in a wireless communication system, and more particularly, to a circuit for controlling a switching time of a transmitting and receiving signal in a wireless communication system, capable of being used in various wireless communication systems by adjusting an RC time constant of an N-type metal oxide semiconductor (NMOS) switch used in a high frequency switch circuit.

2. Description of the Related Art

An example of a scheme used in a portable wireless communication system includes an extended global system for mobile communications (EGSM) scheme and a digital cellular system (DCS) scheme that are mainly used in Europe, a global system for mobile communications 850 (GSM850) scheme and a global system for mobile communications 1900 (GSM1900) scheme that are mainly used in the United States, a personal digital cellular (PDC) scheme that is mainly used in Japan, and the like. However, due to the recent rapid popularization of a cellular phone, system users have not been satisfied in a frequency band allocated to each system particularly in large cities of advanced countries. For example, a problem such as connection difficulty, disconnection during a call, or the like, has been generated.

Therefore, as a countermeasure for solving this problem, a method of allowing users to use a plurality of systems to promote an increase in a substantially available frequency and expanding a server user zone or effectively utilizing communication infrastructures of each system has been suggested.

Meanwhile, due to the development of a wireless communication industry, radio frequency (RF) components such as a low noise amplifier, an oscillator, a high output amplifier, a switch, and the like, manufactured by an integrated circuit technology have been developed in various applications such as a mobile phone, a wireless local area network (WLAN), and the like. In accordance with the development of the wireless communication industry, a use frequency band has also been raised and an RF component operated in a frequency of an X band or more has been demanded.

An example of a switch operated in a high frequency band such as a microwave, or the like, includes a single pole double through (SPDT) switch. A general SPDT switch uses a field effect transistor (FET) based element. At the time of designing the SPDT switch, an FET element having a large area is generally used as a serial switching element in order to reduce insertion loss, and an FET element having a relatively small area is used as a switching element connected in parallel with the serial switching element in order to improve isolation characteristics.

Research into improving performance of the SPDT switch has been variously conducted according to an application. For example, there are an SPDT switch using a parallel resonator in order to remove a parasitic component to improve isolation and reflection loss, an SPDT switch including an impedance converting circuit added between switching elements in order to certainly short-circuit and open impedance in a turn-on and turn-off state of the switching elements, and the like. Particularly, the latter case adopts a structure capable of obtaining high isolation and low insertion loss; however, it basically includes a filter structure, such that it has narrow band characteristics. Therefore, the latter case has a limited application and is difficult to use.

RELATED ART DOCUMENT

Patent Document (Patent Document 1) Japanese Patent Laid-Open Publication No. 2007-143112

SUMMARY OF THE INVENTION

An object of the present invention is to provide a circuit for controlling a switching time of a transmitting and receiving signal in a wireless communication system, capable of being used in various wireless communication systems by adjusting an RC time constant of an N-type metal oxide semiconductor (NMOS) switch used in a high frequency switch circuit using the fact that switching times of switches for a global system for mobile communications (GSM) and WiFi required in a time division duplex (TDD) system are different.

According to an exemplary embodiment of the present invention, there is provided a circuit for controlling a switching time of a transmitting and receiving signal in a wireless communication system, which is a circuit installed between an antenna and a signal transmitter and a signal receiver of a wireless communication device to perform a selective switching operation according to a switching time required in the wireless communication system, the circuit including: a high speed switch circuit unit receiving a signal received from the antenna or a signal to be transmitted through the antenna to perform a high speed switching operation; a low speed switch circuit unit connected in parallel with the high speed switch circuit unit and receiving the signal received from the antenna or the signal to be transmitted through the antenna to perform a low speed switching operation; and a controlling unit electrically connected to each of the high speed switch circuit unit and the low speed switch circuit unit and applying a control signal for controlling a switching time to the high speed switch circuit unit or the low speed switch circuit unit, wherein the control signal is selectively applied from the controlling unit to the high speed switch circuit unit or the low speed switch circuit unit according to the switching time required in the wireless communication system to selectively operate the high speed switch circuit unit or the low speed switch circuit unit.

The high speed switch circuit unit may include at least one semiconductor switching element and a resistor.

The high speed switch circuit unit may be formed of a circuit having two semiconductor switching elements connected in series with each other and a resistor connected to a common connection line commonly connected to gate terminals of each semiconductor switching element.

The semiconductor switching element may be a field effect transistor (FET).

The semiconductor switching element may be a metal oxide semiconductor field effect transistor (MOSFET).

The semiconductor switching element may be an N-type MOSFET.

The low speed switch circuit unit may include at least two semiconductor switching elements and a resistor.

The low speed switch circuit unit may be formed of a circuit having four semiconductor switching elements connected in series with each other and a resistor connected to a common connection line commonly connected to gate terminals of each semiconductor switching element.

The semiconductor switching element may be an FET.

The semiconductor switching element may be a MOSFET.

The semiconductor switching element may be an N-type MOSFET.

The controlling unit may be formed of a separate local controller receiving a command associated with the switching time control from a main controlling unit controlling the entire system (circuit) of the wireless communication device to control only the high speed switch circuit unit and the low speed switch circuit unit.

The controlling unit may be formed integrally with a main control part controlling the entire system (circuit) of the wireless communication device.

DESCRIPTION OF THE PREFERRED EMBODIMENTS

Terms and words used in the present specification and claims are not to be construed as a general or dictionary meaning, but are to be construed to meaning and concepts meeting the technical ideas of the present invention based on a principle that the inventors can appropriately define the concepts of terms in order to describe their own inventions in the best mode.

Throughout the present specification, unless explicitly described to the contrary, "comprising" any components will be understood to imply the inclusion of other elements rather than the exclusion of any other elements. A term "part", "module", "device", or the like, described in the specification means a unit of processing at least one function or operation and may be implemented by hardware or software or a combination of hardware and software.

Hereinafter, exemplary embodiments of the present invention will be described in detail with reference to the accompanying drawings.

Before an exemplary embodiment of the present invention is described, a high frequency band switch will be first described in order to assist in the understanding of the present invention.

Figure 1:
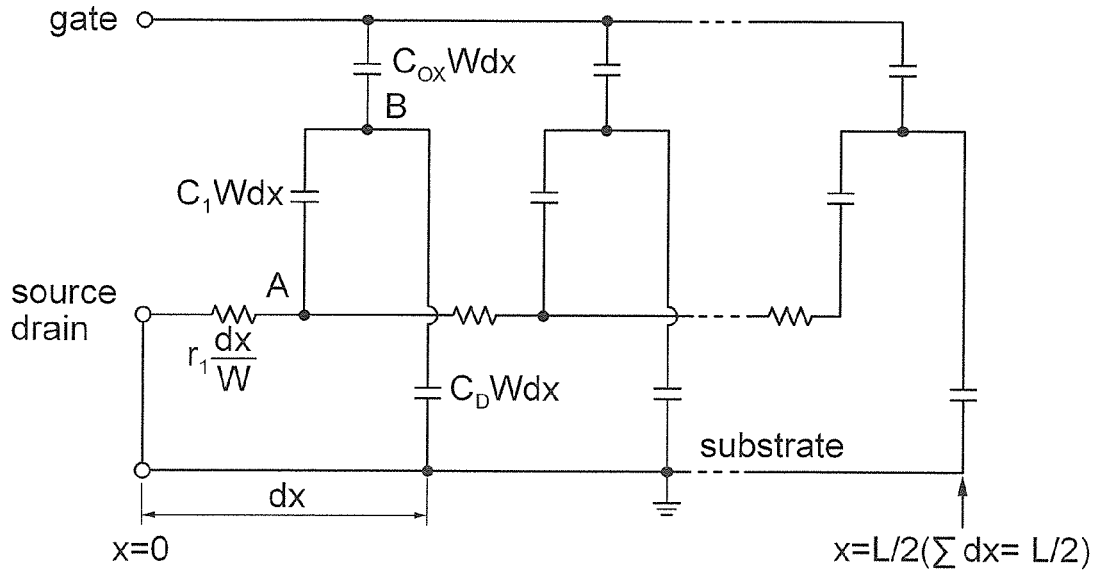
FIG. 1 is an N-type metal oxide semiconductor (NMOS) equivalent circuit diagram of a high frequency band switch.

FIG. 1 is an N-type metal oxide semiconductor (NMOS) equivalent circuit diagram of a high frequency band switch.

As shown in FIG. 1, the high frequency band switch may be implemented by a polysilicon gate NMOS of which an equivalent circuit may be represented as a serial and parallel combination circuit of a plurality of capacitors and resistors. In FIG. 1, $C_{ox}$ indicates gate oxide capacitance, $C_1$ indicates gate inversion capacitance, $C_D$ indicates gate depletion capacitance, Wd indicates a channel width, and L indicates a channel length.

Figure 2:
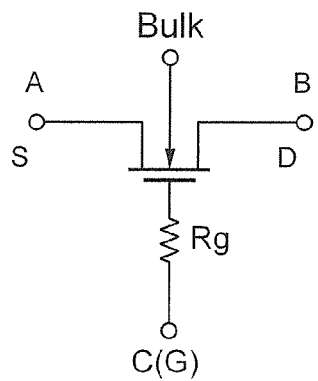
FIG. 2 is a circuit diagram in which an RC time constant in a transistor is implemented by an N-type metal oxide semiconductor field effect transistor (NMOSFET)

In a transistor of FIG. 1, a channel transit time may be defined by an RC time constant of the channel. A circuit for the transistor may be implemented by connecting a resistor Rg to a gate of an NMOS as shown in FIG. 2 and be represented by an RC equivalent circuit again as shown in FIG. 3.

Figure 3:
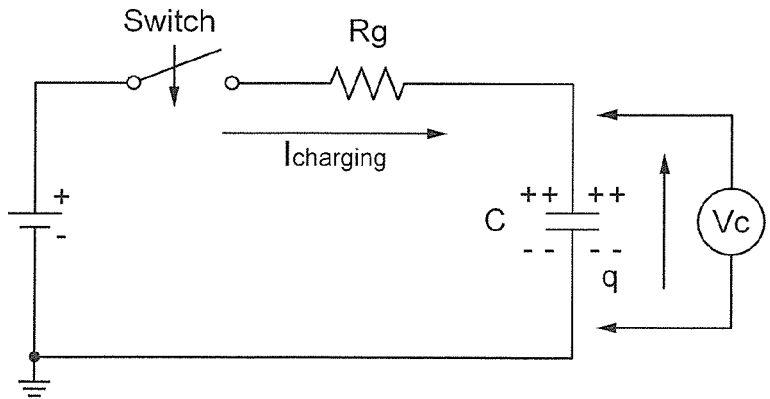
FIG. 3 is an RC equivalent circuit diagram for a circuit of FIG. 2.
Figure 4:
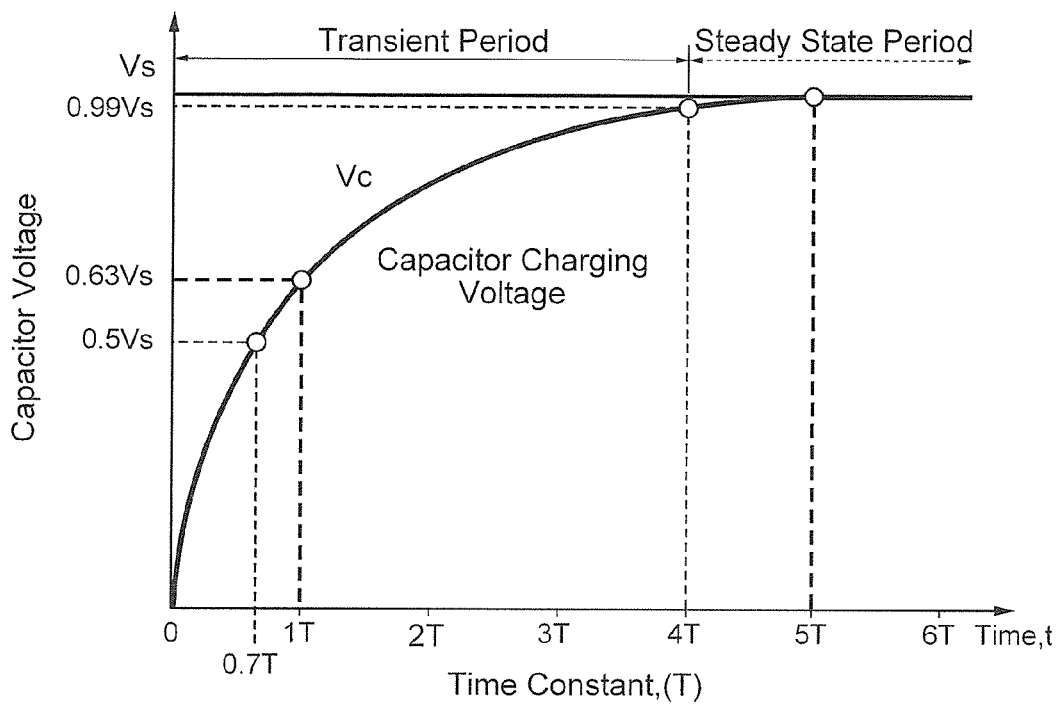
FIG. 4 is a diagram showing a characteristic curve of capacitor charging voltage for a time constant (T)

In FIG. 3, a gate resistor Rg and a gate channel capacitance C may be represented by function of the time constant. In addition, it may be appreciated from FIG. 4 that capacitor charging voltage Vc has charging characteristics in which it is completely charged after 5T.

Next, a circuit for controlling a switching time according to an exemplary embodiment of the present invention will be described based on the high frequency band switch, the equivalent circuit thereof, and the time constant.

Figure 5:
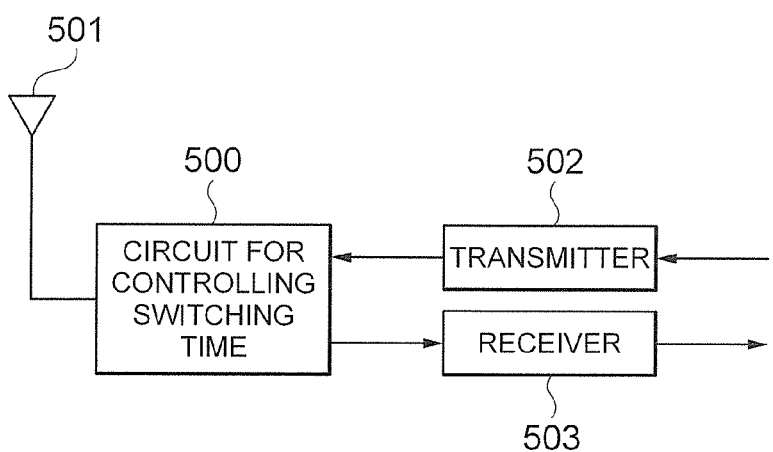
FIG. 5 is a diagram showing a state in which a circuit for controlling a switching time of a transmitting and receiving signal in a wireless communication system according to an exemplary embodiment of the present invention is used in a wireless communication device.
Figure 6:
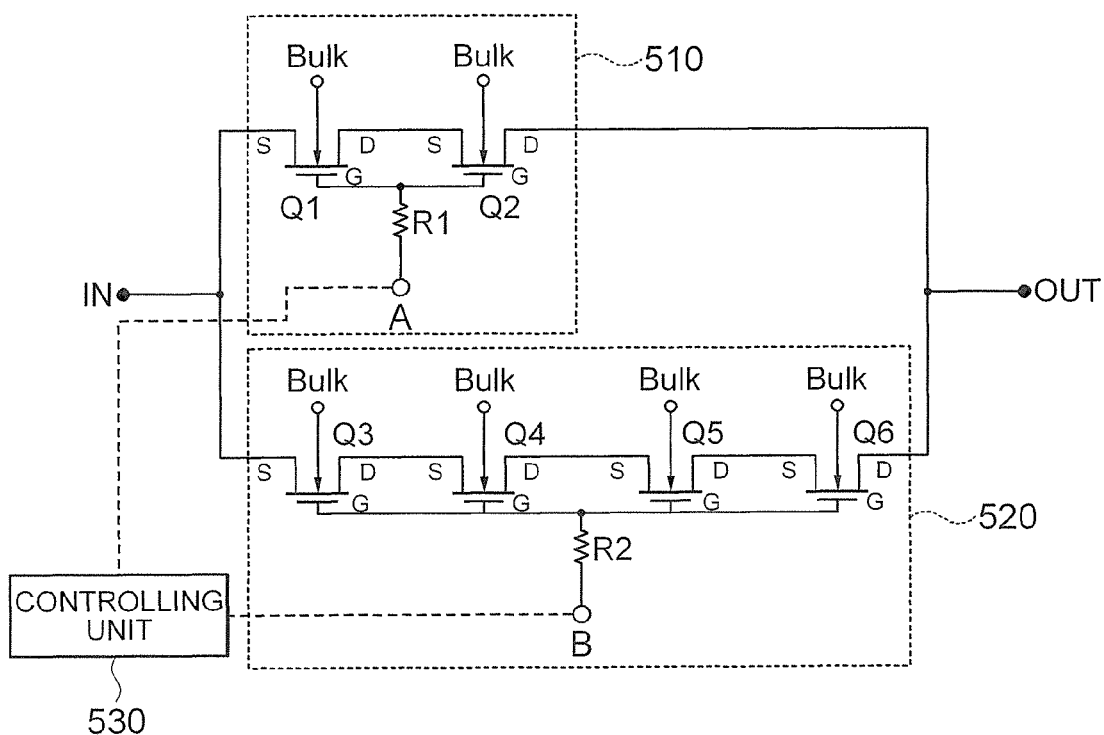
FIG. 6 is a diagram schematically showing a configuration of the circuit for controlling a switching time of a transmitting and receiving signal in a wireless communication system according to the exemplary embodiment of the present invention.

FIGS. 5 and 6 show a circuit for controlling a switching time of a transmitting and receiving signal in a wireless communication system according to an exemplary embodiment of the present invention, wherein FIG. 5 is a diagram showing a state in which a circuit for controlling a switching time of a transmitting and receiving signal in a wireless communication system according to an exemplary embodiment of the present invention is used in a wireless communication device; and FIG. 6 is a diagram schematically showing a configuration of the circuit for controlling a switching time of a transmitting and receiving signal in a wireless communication system according to the exemplary embodiment of the present invention.

Referring to FIGS. 5 and 6, the circuit 500 for controlling a switching time of a transmitting and receiving signal in a wireless communication system according to the exemplary embodiment of the present invention may be installed between an antenna 501 of a wireless communication device and a signal transmitter 501 and a signal receiver 502 thereof to perform a selective switching operation according to a switching time required in a wireless communication system and may be configured to include a high speed switch circuit unit 510, a low speed switch circuit unit 520, and a controlling unit 530.

The high speed switch circuit unit 510 receives a signal received from the antenna 501 or a signal to be transmitted through the antenna 501 to perform a switching operation at a high speed (for example, at a speed of 400 ns). Here, the high speed switch circuit unit 510 may include at least one semiconductor switching element and a resistor.

In addition, the high speed switch circuit unit 510 may be formed of a circuit having two semiconductor switching elements Q1 and Q2 connected in series with each other and a resistor R1 connected to a common connection line commonly connected to gate G terminals of each semiconductor switching element, as in the present embodiment.

Here, as the semiconductor switching elements Q1 and Q2, a field effect transistor (FET) may be used.

Further, as the semiconductor switching elements Q1 and Q2, a metal oxide semiconductor field effect transistor (MOSFET) may also be used.

In addition, as the semiconductor switching elements Q1 and Q2, preferably, an n-type MOSFET may be used. However, the semiconductor switching elements Q1 and Q2 are not necessarily limited to the n-type MOSFET as described above. That is, in some cases, a p-type MOSFET, a complementary metal oxide semiconductor (CMOS), or the like, may also be used.

The low speed switch circuit unit 520 is connected in parallel with the high speed switch circuit unit 510 and receives the signal received from the antenna 501 or the signal to be transmitted through the antenna 501 to perform a switching operation at a low speed (for example, at a speed of 2 μs). Here, the low speed switch circuit unit 520 may include at least two semiconductor switching elements and a resistor.

In addition, the low speed switch circuit unit 520 may be formed of a circuit having four semiconductor switching elements Q3 to Q6 connected in series with each other and a resistor R2 connected to a common connection line commonly connected to gate G terminals of each semiconductor switching element, as in the present embodiment. Although the case in which the low speed switch circuit unit 520 includes a serial connection circuit of the four semiconductor switching elements Q3 to Q6 is described by way of example in the present embodiment, the low speed switch circuit unit 520 is not necessarily limited to including the four semiconductor elements as described above. That is, in some cases, the low speed switch circuit unit 520 may also include three, five, or six semiconductor switching elements.

Here, as the semiconductor switching elements Q3 to Q6, a field effect transistor (FET) may be used.

Further, as the semiconductor switching elements Q3 to Q6, a metal oxide semiconductor field effect transistor (MOSFET) may be used.

In addition, as the semiconductor switching elements Q3 to Q6, preferably, an n-type MOSFET may be used. However, the semiconductor switching elements Q3 to Q 6 are not necessarily limited to the n-type MOSFET as described above. That is, in some cases, a p-type MOSFET, a complementary metal oxide semiconductor (CMOS), or the like, may also be used.

The controlling unit 530 is electrically connected to each of the high speed switch circuit unit 510 and the low speed switch circuit unit 520 and applies a control signal for controlling a switching time to the high speed switch circuit unit 510 or the low speed switch circuit unit 520. Here, the above-mentioned controlling unit 530 may be formed of a separate local controller receiving a command associated with the switching time control from a main controlling unit (not shown) controlling the entire system (circuit) of the wireless communication device to control only the high speed switch circuit unit 510 and the low speed switch circuit unit 520.

In addition, the controlling unit 530 may be formed integrally with the main control part controlling the entire system (circuit) of the wireless communication device.

The circuit for controlling a switching time of a transmitting and receiving signal in a wireless communication system according to the exemplary embodiment of the present invention configured as described above selectively applies the control signal from the controlling unit 530 to the high speed switch circuit unit 510 or the low speed switch circuit unit 520 according to the switching time required in the wireless communication system to selectively operate the high speed switch circuit unit 510 or the low speed switch circuit unit 520.

In addition, the circuit for controlling a switching time of a transmitting and receiving signal in a wireless communication system according to the exemplary embodiment of the present invention configured as described above adjusts an RC time constant of an NMOS switch used in a high frequency switch circuit using the fact that switching times of switches for a global system for mobile communications (GSM) and WiFi required in a time division duplex (TDD) system are different, as described above, to actively cope with the switching time required in the wireless communication system, such that it may be used in various wireless communication systems. To this end, in the present invention, the RC time constant is introduced.

The RC time constant introduced in the present invention may be represented by $T=R*C$. Therefore, when a value of channel capacitance C of the NMOS is decreased, the time constant T may be decreased, such that the switching time of the transmitting and receiving signal may be adjusted to be fast.

In addition, when a value of channel capacitance C of the NMOS is increased, the time constant T may be increased, such that the switching time of the transmitting and receiving signal may be adjusted to be slow.

Therefore, according to the present invention, the switch circuit (that is, the high speed switch circuit unit 510 or the low speed switch circuit unit 520) may be selectively operated according to the switching time required in the wireless communication system.

In the circuit 500 for controlling a switching time of a transmitting and receiving signal in a wireless communication system according to the exemplary embodiment of the present invention shown in FIG. 6, in the case in which high speed switching is required, the number of stacked NMOSs may be decreased as in the high speed switch circuit unit 510, and in the case in which low speed switching is required, the number of stacked NMOSs may be increased as in the low speed switch circuit unit 520.

Figure 7:
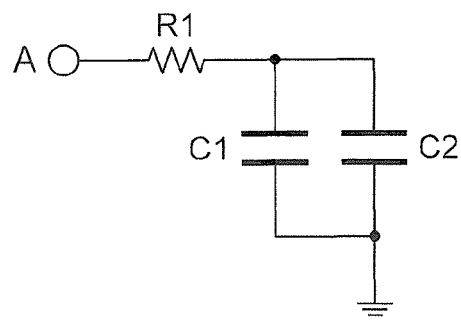
FIG. 7 is an equivalent circuit diagram of a high speed switch circuit unit of the circuit for controlling a switching time of a transmitting and receiving signal in a wireless communication system according to the exemplary embodiment of the present invention.
Figure 8:
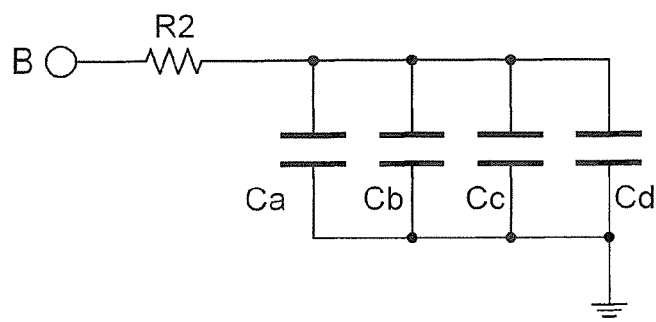
FIG. 8 is an equivalent circuit diagram of a low speed switch circuit unit of the circuit for controlling a switching time of a transmitting and receiving signal in a wireless communication system according to the exemplary embodiment of the present invention.

Meanwhile, FIG. 7 is an equivalent circuit diagram of the high speed switch circuit unit 510; and FIG. 8 is an equivalent circuit diagram of the low speed switch circuit unit 520.

Referring to FIG. 7, when a control signal from the controlling unit 530 is applied to a node A, since the number of stacked NMOS switches is two, a circuit in which two capacitances C1 and C2 are connected in parallel with each other may be driven. Therefore, a total capacitance value is C1+C2, such that a time constant $T=R*(C1+C2)$. As described above, when the value of the channel capacitance C is decreased, the time constant T may also be decreased, such that the switching time of the transmitting and receiving signal may be adjusted to be rapid.

Referring to FIG. 8, when the control signal from the controlling unit 530 is applied to a node B in a scheme similar to that of in FIG. 7, since the number of stacked NMOS switches is four, a circuit in which four capacitances Ca, Cb, Cc, and Cd are connected in parallel with each other may be driven. Therefore, a total capacitance value is C1+C2+C3+C4, such that the time constant T=R*(C1+C2+C3+C4). As described above, when the value of the channel capacitance C is increased, the time constant T may also be increased, such that the switching time of a transmitting and receiving signal may be adjusted to be slow.

As set forth above, the circuit for controlling a switching time of a transmitting and receiving signal in a wireless communication system according to the exemplary embodiment of the present invention adjusts an RC time constant of an NMOS switch used in a high frequency switch circuit using the fact that switching times of switches for a global system for mobile communications (GSM) and WiFi required in a time division duplex (TDD) system are different to actively cope with the switching time required in the wireless communication system, such that it may be used in various wireless communication systems.

Although the exemplary embodiments of the present invention have been disclosed for illustrative purposes, the present invention is not limited thereto, but those skilled in the art will appreciate that various modifications, additions and substitutions are possible, without departing from the scope and spirit of the invention as disclosed in the accompanying claims. Therefore, the protection scope of the present invention must be analyzed by the appended claims and it should be analyzed that all spirits within a scope equivalent thereto are included in the appended claims of the present invention.

What is claimed is:

1. A circuit for controlling a switching time of a transmitting and receiving signal in a wireless communication system, which is a circuit installed between an antenna and a signal transmitter and a signal receiver of a wireless communication device to perform a selective switching operation according to a switching time required in the wireless communication system, the circuit comprising:
a high speed switch circuit unit receiving a signal received from the antenna or a signal to be transmitted through the antenna to perform a high speed switching operation;
a low speed switch circuit unit connected in parallel with the high speed switch circuit unit and receiving the signal received from the antenna or the signal to be transmitted through the antenna to perform a low speed switching operation; and
a controlling unit electrically connected to each of the high speed switch circuit unit and the low speed switch circuit unit and applying a control signal for controlling a switching time to the high speed switch circuit unit or the low speed switch circuit unit,
wherein the control signal is selectively applied from the controlling unit to the high speed switch circuit unit or the low speed switch circuit unit according to the switching time required in the wireless communication system to selectively operate the high speed switch circuit unit or the low speed switch circuit unit.

2. The circuit according to claim 1, wherein the high speed switch circuit unit includes at least one semiconductor switching element and a resistor.

3. The circuit according to claim 2, wherein the semiconductor switching element is a field effect transistor (FET).

4. The circuit according to claim 2, wherein the semiconductor switching element is a metal oxide semiconductor field effect transistor (MOSFET).

5. The circuit according to claim 4, wherein the semiconductor switching element is an N-type MOSFET.

6. The circuit according to claim 1, wherein the high speed switch circuit unit is formed of a circuit having two semiconductor switching elements connected in series with each other and a resistor connected to a common connection line commonly connected to gate terminals of each semiconductor switching element.

7. The circuit according to claim 6, wherein the semiconductor switching element is a field effect transistor (FET).

8. The circuit according to claim 6, wherein the semiconductor switching element is a MOSFET.

9. The circuit according to claim 8, wherein the semiconductor switching element is a N-type MOSFET.

10. The circuit according to claim 1, wherein the low speed switch circuit unit includes at least two semiconductor switching elements and a resistor.

11. The circuit according to claim 10, wherein the semiconductor switching element is an FET.

12. The circuit according to claim 10, wherein the semiconductor switching element is a MOSFET.

13. The circuit according to claim 12, wherein the semiconductor switching element is an N-type MOSFET.

14. The circuit according to claim 1, wherein the low speed switch circuit unit is formed of a circuit having four semiconductor switching elements connected in series with each other and a resistor connected to a common connection line commonly connected to gate terminals of each semiconductor switching element.

15. The circuit according to claim 14, wherein the semiconductor switching element is an FET.

16. The circuit according to claim 14, wherein the semiconductor switching element is a MOSFET.

17. The circuit according to claim 16, wherein the semiconductor switching element is an N-type MOSFET.

18. The circuit according to claim 1, wherein the controlling unit is formed of a separate local controller receiving a command associated with the switching time control from a main controlling unit controlling the entire system (circuit) of the wireless communication device to control only a high speed switch circuit unit and the low speed switch circuit unit.

19. The circuit according to claim 1, wherein the controlling unit is formed integrally with a main control part controlling the entire system (circuit) of the wireless communication device.

* * * * *